US010731072B2

(12) United States Patent
Armstrong

(10) Patent No.: US 10,731,072 B2
(45) Date of Patent: Aug. 4, 2020

(54) METHOD OF PREVENTING OR MITIGATING FORMATION OF METAL SULFIDE SCALES DURING OIL AND GAS PRODUCTION

(71) Applicant: BAKER HUGHES, A GE COMPANY, LLC, Houston, TX (US)

(72) Inventor: Charles David Armstrong, Tomball, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 163 days.

(21) Appl. No.: 15/349,468

(22) Filed: Nov. 11, 2016

(65) Prior Publication Data

US 2017/0145291 A1  May 25, 2017

Related U.S. Application Data

(60) Provisional application No. 62/259,939, filed on Nov. 25, 2015.

(51) Int. Cl.
*C09K 8/528* (2006.01)
*C09K 8/532* (2006.01)
*C10G 75/04* (2006.01)

(52) U.S. Cl.
CPC .............. *C09K 8/528* (2013.01); *C09K 8/532* (2013.01); *C10G 75/04* (2013.01); *C09K 2208/20* (2013.01)

(58) Field of Classification Search
CPC .... C09K 8/528; C09K 8/532; C09K 2208/20; C09K 220/20; C10G 75/04
See application file for complete search history.

(56) References Cited

U.S. PATENT DOCUMENTS

| 3,434,969 | A | | 3/1969 | Ralston et al. | |
|---|---|---|---|---|---|
| 4,426,880 | A | * | 1/1984 | Walters | G01N 17/008 73/61.62 |
| 5,002,657 | A | * | 3/1991 | Botts | B01D 17/00 210/115 |
| 5,083,609 | A | * | 1/1992 | Coleman | E21B 43/124 166/105 |
| 7,159,655 | B2 | * | 1/2007 | Ke | C09K 8/528 166/279 |
| 7,195,070 | B2 | * | 3/2007 | Delaloye | E21B 37/06 166/304 |
| 7,640,978 | B2 | * | 1/2010 | Pfeiffer | E21B 43/40 166/246 |
| 9,090,814 | B2 | * | 7/2015 | Armstrong | C09K 8/68 |
| 9,505,044 | B2 | * | 11/2016 | Vittur | C02F 1/56 |
| 9,822,594 | B2 | * | 11/2017 | Vittur | E21B 21/068 |
| 2006/0011345 | A1 | * | 1/2006 | Delaloye | E21B 37/06 166/304 |
| 2007/0092930 | A1 | * | 4/2007 | Lal | C09K 8/582 435/41 |
| 2009/0133882 | A1 | * | 5/2009 | Delaloye | E21B 37/06 166/377 |
| 2010/0212888 | A1 | * | 8/2010 | Hendrickson | C09K 8/582 166/246 |
| 2011/0027803 | A1 | * | 2/2011 | Moussavi | C08F 2/005 435/7.9 |
| 2012/0006550 | A1 | * | 1/2012 | Shampine | E21B 43/267 166/305.1 |
| 2013/0043678 | A1 | * | 2/2013 | Saar | F02C 1/005 290/2 |
| 2013/0289961 | A1 | * | 10/2013 | Ray | E21B 47/00 703/10 |
| 2014/0041877 | A1 | * | 2/2014 | Armstrong | C09K 8/68 166/308.1 |
| 2015/0129231 | A1 | * | 5/2015 | Vittur | C02F 1/56 166/308.3 |
| 2016/0130496 | A1 | * | 5/2016 | Holtsclaw | C04B 24/32 507/226 |

FOREIGN PATENT DOCUMENTS

| IL | 30420 A | | 11/1971 | |
|---|---|---|---|---|
| WO | WO-9630625 A1 | * | 10/1996 | .............. B04B 1/08 |
| WO | WO-2014026003 A1 | * | 2/2014 | .............. C09K 8/68 |
| WO | 2015034478 A1 | | 3/2015 | |
| WO | WO-2015034478 A1 | * | 3/2015 | .............. C04B 24/32 |

OTHER PUBLICATIONS

European Patent Office; PCT International Search Report, issued in connection to PCT/US2016/061581; dated Jan. 25, 2017; 4 pages; Europe.

European Patent Office; PCT Written Opinion of the International Searching Authority, issued in connection to PCT/US16/061581; 5 pages; Europe.

(Continued)

*Primary Examiner* — Pamela H Weiss
(74) *Attorney, Agent, or Firm* — Greenberg Traurig LLP

(57) ABSTRACT

A method of preventing or mitigating the formation of metal sulfide scale in a fluid is provided. The fluid can be treated with an additive comprising thiamine. The fluid can be a production fluid from an oil and gas well. The production fluid can include crude oil. The fluid can include an aqueous fluid. The aqueous fluid can further include crude oil. The metal sulfide scale can include iron sulfide scale and/or zinc sulfide scale.

7 Claims, No Drawings

(56) References Cited

OTHER PUBLICATIONS

M.A. Quraishi et al.; Investigation of Some Green Compounds as Corrosion and Scale Inhibitors for Cooling Systems; Corrosion Science Section [XP-000831220]; May 1, 1999; pp. 493-497; vol. 55, No. 5.
European Patent Office; Communication Pursuant to Rules 161(1) and 162 EPC, issued in connection to counterpart application No. EP16806340.2; dated Jul. 25, 2018; 3 pages; Europe.
Patent Office of the Cooperation Council for the Arab States of the Gulf; Examination Report, issued in connection to counterpart application No. GC216-32415; dated Dec. 14, 2018; 3 pages; GCC.
New Zealand Intellectual Property Office; First Examination Report, issued in connection to counterpart application No. 743052; dated Aug. 31, 2018; 3 pages; New Zealand.
Australian Government, IP Australia, Examination Report No. 1 for Standard Patent Application, issued in connection to AU2016359035; dated Nov. 29, 2018; 3 pages; Australia.

* cited by examiner

METHOD OF PREVENTING OR MITIGATING FORMATION OF METAL SULFIDE SCALES DURING OIL AND GAS PRODUCTION

RELATED APPLICATIONS

This application claims the benefit, and priority benefit, of U.S. Provisional Patent Application Ser. No. 62/259,939, filed Nov. 25, 2015, the disclosure and contents of which are incorporated by reference herein in their entirety.

BACKGROUND

1. Field of the Invention

The presently disclosed subject matter relates to preventing or mitigating formation of metal sulfide scales during oil and gas production.

2. Description of Art

Iron sulfide (FeS) is a form of metal sulfide that is often present in sour systems due to the reaction between iron and hydrogen sulfide. The iron sulfide can form scales which accumulate over time in production tubing, pipelines, heat exchangers, valves and other equipment.

There are a number of problems associated with iron sulfide scales. For example, the scaling can lead to bacterial growth and corrosion. It can also cause flow assurance problems as scale builds up in the equipment. Additionally, iron sulfide can be converted into toxic hydrogen sulfide ($H_2S$) upon exposure to acids. Dry iron sulfide is pyrophoric and ignites spontaneously when exposed to air. Further, iron sulfide at the oil-water interface can stabilize emulsions and interfere with downstream separation processes. Also, inhibition chemistry for iron sulfide is often based on toxic acrolein chemistry which presents a significant danger to both human health and the environment.

Thus, prevention or mitigation of metal sulfide scale, and in particular iron sulfide scale, during oil and gas production is desired.

SUMMARY

Various illustrative embodiments of a method of preventing or mitigating the formation of metal sulfide scale in a fluid are provided. In certain illustrative embodiments, the fluid can be treated with an additive comprising thiamine. The fluid can be a production fluid from an oil and gas well. The production fluid can include crude oil. The fluid can include an aqueous fluid. The aqueous fluid can further include crude oil. The metal sulfide scale can include iron sulfide scale. The metal sulfide scale can include zinc sulfide scale.

Various illustrative embodiments of a method of preventing or mitigating the formation of metal sulfide scale in downstream equipment containing production fluid from an oil and gas well are also provided. In certain illustrative embodiments, the production fluid can be treated with an additive comprising thiamine. The production fluid can include crude oil. The metal sulfide scale can include iron sulfide scale. The metal sulfide scale can include zinc sulfide scale. The downstream equipment can be selected from the group consisting of pipes, pipelines, separators, dehydrators, strainers, centrifuged cyclones, and electrostatic precipitators.

Various illustrative embodiments of a method of reducing the amount of metal sulfide scale in a fluid are also provided. In certain illustrative embodiments, the fluid can be treated with an additive comprising thiamine. The fluid can include a production fluid from an oil and gas well. The production fluid can include crude oil. The fluid can include an aqueous fluid. The aqueous fluid can further include crude oil. The metal sulfide scale can include iron sulfide scale. The metal sulfide scale can include zinc sulfide scale.

Various illustrative embodiments of a method of reducing the amount of metal sulfide scale in downstream equipment containing production fluid from an oil and gas well are also provided. In certain illustrative embodiments, the production fluid can be treated with an additive comprising thiamine. The production fluid can include crude oil. The metal sulfide scale can include iron sulfide scale. The metal sulfide scale can include zinc sulfide scale. The downstream equipment can be selected from the group consisting of pipes, pipelines, separators, dehydrators, strainers, centrifuged cyclones, and electrostatic precipitators.

While the presently disclosed subject matter will be described in connection with the preferred embodiment, it will be understood that it is not intended to limit the presently disclosed subject matter to that embodiment. On the contrary, it is intended to cover all alternatives, modifications, and equivalents, as may be included within the spirit and the scope of the presently disclosed subject matter as defined by the appended claims.

DETAILED DESCRIPTION

Disclosed herein are various illustrative embodiments of a method for preventing or mitigating the formation of metal sulfide scales during oil and gas production.

In certain illustrative embodiments, the metal sulfide can be iron sulfide. The iron sulfide can comprise, for example, troilite (FeS), pyrite ($FeS_2$), mackinawite ($Fe_9S_8$) or phyrrhotite ($Fe_7S_8$). The metal sulfide can also include minor amounts of lead sulfides or zinc sulfides or be a combination of the foregoing components.

In certain illustrative embodiments, a production fluid from an oil and gas well can be treated with an additive that prevents or mitigates the formation of metal sulfide scales. The production fluid can be, for example, crude oil.

In certain illustrative embodiments, the crude oil can be a single phase or have multiple phases. For example, the crude oil may be an oil-in-water emulsion or a water-in-oil emulsion. If allowed to stand, the crude oil may separate into distinct aqueous and non-aqueous phases that may or may not include both solid and dissolved contaminants. For the purposes of the presently disclosed subject matter, all of these aforementioned aspects of crude oil are collectively referred to as crude oil.

In certain illustrative embodiments, the additive can comprise thiamine. Thiamine, also known as Vitamin B1, can prevent or mitigate sulfide formation and can also be effective in reducing the amount of sulfate precipitate that has already formed.

Thiamine is a colorless organosulfur compound with the chemical formula $C_{12}H_{17}N_4OS$ and the following structure:

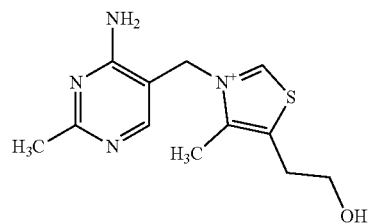 [SMILES: Cc1ncc(C[n+]2csc(CCO)c2C)c(N)n1]

As a natural biological chemical, thiamine is a sustainable resource and is safe for human health and the environment. Thiamine can also be obtained in bulk quantities from multiple different manufacturers. As such, thiamine can provide a cost effective solution for preventing or mitigating sulfide formation.

In certain illustrative embodiments, the additive can be introduced into the production fluid. The amount of additive necessary to effectively prevent or mitigate metal sulfide scale production can vary based on a number of variables. For example, the concentration of metal sulfide and water in the production fluid may affect the amount of additive needed. In certain illustrative embodiments, the additive can be added to the production fluid in stoichiometric ratios as needed. Those of ordinary skill in the art of producing and transporting crude oil would recognize and be able to determine the appropriate dosage of additive that is needed in the production fluid for treating the scale formation.

The additive may be introduced into the production fluid via a number of means. For example, in certain illustrative embodiments, thiamine or a ylid or ylide (often called a Wittig reagent) may be mixed with water and then added directly to an injection fluid, fracturing fluid, drilling mud or any other type of fluid designed to be added to an oil and gas well. Alternatively, a solid, powder, or crystalized thiamine can be added directly to the aqueous portion of the well, fluid, tank, pit, etc. in a sufficient amount to reduce/remove/mitigate iron sulfide formation.

In certain illustrative embodiments, the additive can be admixed with or co-injected with other additives useful in the production of crude oil. For example, the additive may be admixed with or co-injected with defoamers, asphaltene inhibitors, corrosion inhibitors, and any other materials that do not interfere with the function of the additive in preventing or mitigating the formation of metal sulfide scales.

In certain illustrative embodiments, the additive is effective in preventing or mitigating the formation of sulfide scales both in downstream equipment. For purposes of the presently disclosed subject matter, the phrase downstream equipment refers broadly to the pipes, pipelines, vessels, trucks, and the like used to transport crude oil from the oil field to the refinery and also to any equipment with which the crude oil comes into contact. For example, such equipment may include, but is not limited to, separators, dehydrators, strainers, centrifuged cyclones, and electrostatic precipitators.

In certain illustrative embodiments, the additive is effective in preventing or mitigating the formation of sulfide scales in an oil and gas well. For purposes of the presently disclosed subject matter, the phrase oil and gas well refers broadly to any well or boring in the Earth that is designed to bring petroleum oil hydrocarbons and/or water to the surface.

In certain illustrative embodiments, the additive is effective in removing sulfide scales that have already formed in an oil and gas well or downstream equipment or tanks, pipelines, rail cars, cooling towers, ponds, etc. In this regard, it is believed that thiamine can attack $H_2S$ directly.

While not wishing to be bound by any theory, it is believed that the additive disperses the metal sulfides, thereby preventing or mitigating the formation of scale on equipment as well as facilitating the removal of scales that have already formed.

The presently disclosed method for preventing or mitigating the formation of metal sulfide scales may be used in other situations beyond just oil wells. For example, in certain illustrative embodiments, the presently disclosed subject matter may be utilized in locations such as railcars, pipelines, refineries, ponds, tanks, towers and pits. It can also be used in produced water samples and to combat/mitigate production of $H_2S$ by biogenic sulfide corrosion caused by sulfate reducing bacteria (or "SRB"). It can also be used for natural forms of $H_2S$/iron sulfide formation. In general, the presently disclosed subject matter may be utilized anywhere that $H_2S$/iron sulfide formation can occur.

In certain illustrative embodiments, the presently disclosed method for preventing or mitigating the formation of metal sulfide scales may be used in the aqueous phase of a well, pit, tank, or other type of system. For example, thiamine, which is a water soluble molecule, can be dissolved in a water phase to make a stock solution before being added to the aqueous phase of a well which also contains crude oil. Alternatively, thiamine can be used as a dry powder and added directly to the aqueous phase of the well.

To facilitate a better understanding of the presently disclosed subject matter, the following examples of certain aspects of certain embodiments are given. In no way should the following examples be read to limit, or define, the scope of the presently disclosed subject matter.

Example 1

A pair of bug bottles was provided. 0.1 mL of cultured sulfate reducing bacteria (SRB) from produced water was added to each bug bottle. 0.5 mL of $dH_2O$ was added to the "untreated" sample and 0.5 mL of 100 mg/mL thiamine was added to the treated sample. The bottles were left to incubate overnight at 37° C. The untreated sample was black in color in the morning, which indicated the formation of iron sulfide. The treated sample was clear which indicated that iron sulfide did not form.

While the disclosed subject matter has been described in detail in connection with a number of embodiments, it is not limited to such disclosed embodiments. Rather, the disclosed subject matter can be modified to incorporate any number of variations, alterations, substitutions or equivalent arrangements not heretofore described, but which are commensurate with the scope of the disclosed subject matter.

Additionally, while various embodiments of the disclosed subject matter have been described, it is to be understood that aspects of the disclosed subject matter may include only some of the described embodiments. Accordingly, the disclosed subject matter is not to be seen as limited by the foregoing description, but is only limited by the scope of the appended claims.

What is claimed is:

1. A method of preventing or mitigating the formation of metal sulfide scale in a production fluid in an oil and gas well, the method consisting of treating the production fluid with an additive consisting of thiamine, wherein the thiamine is a water-soluble molecule that is dissolved in a water phase and then delivered into the production fluid in an amount effective to treat metal sulfide scale formation, and wherein the al sulfide scale comprises one or more of iron sulfide scale and zinc sulfide scale.

2. A method of preventing or mitigating the formation of metal sulfide scale in downstream equipment receiving production fluid from an oil and gas well, the method consisting of introducing an additive consisting of thiamine into the production fluid, wherein the thiamine is provided in an amount effective to prevent or mitigate metal sulfide scale formation, and bringing the production fluid into contact with the downstream equipment, wherein the downstream equipment comprises one or more of separators, dehydrators, strainers, centrifuged cyclones, and electrostatic precipitators, and wherein the metal sulfide scale comprises one or more of iron sulfide scale and zinc sulfide scale.

3. A method of preventing or mitigating the formation of metal sulfide scale in a production fluid in an oil and gas well, the method consisting of treating the production fluid with an additive consisting of thiamine, wherein the thiamine is added directly to an aqueous phase of the production fluid in the oil and gas well in solid or dry powder form in an amount effective to treat metal sulfide scale formation, and wherein the metal sulfide scale comprises one or more of iron sulfide scale and zinc sulfide scale.

4. A method of removing metal sulfide scale formed in an oil and gas well or equipment downstream thereof, the method consisting of introducing an additive consisting of thiamine into the oil and gas well or equipment, and dispersing the metal sulfides in the metal sulfide scale with the thiamine, wherein the thiamine is provided in an amount effective to prevent or mitigate metal sulfide scale formation, and wherein the metal sulfide scale comprises one or more of iron sulfide scale and zinc sulfide scale, and wherein the equipment comprises one or more of separators, dehydrators, strainers, centrifuged cyclones, and electrostatic precipitators.

5. The method of claim 1, wherein the thiamine is capable of attacking $H_2S$ directly.

6. The method of claim 1, wherein the additive disperses the metal sulfides, thereby preventing or mitigating the formation of scale as well as facilitating the removal of scales that have already formed.

7. The method of claim 2, wherein the additive mitigates production of $H_2S$ by biogenic sulfide corrosion caused by sulfate reducing bacteria.

* * * * *